Oct. 11, 1960          J. L. COST          2,955,434
METHOD AND APPARATUS FOR FRACTIONATING GASEOUS MIXTURES
Filed Oct. 15, 1956
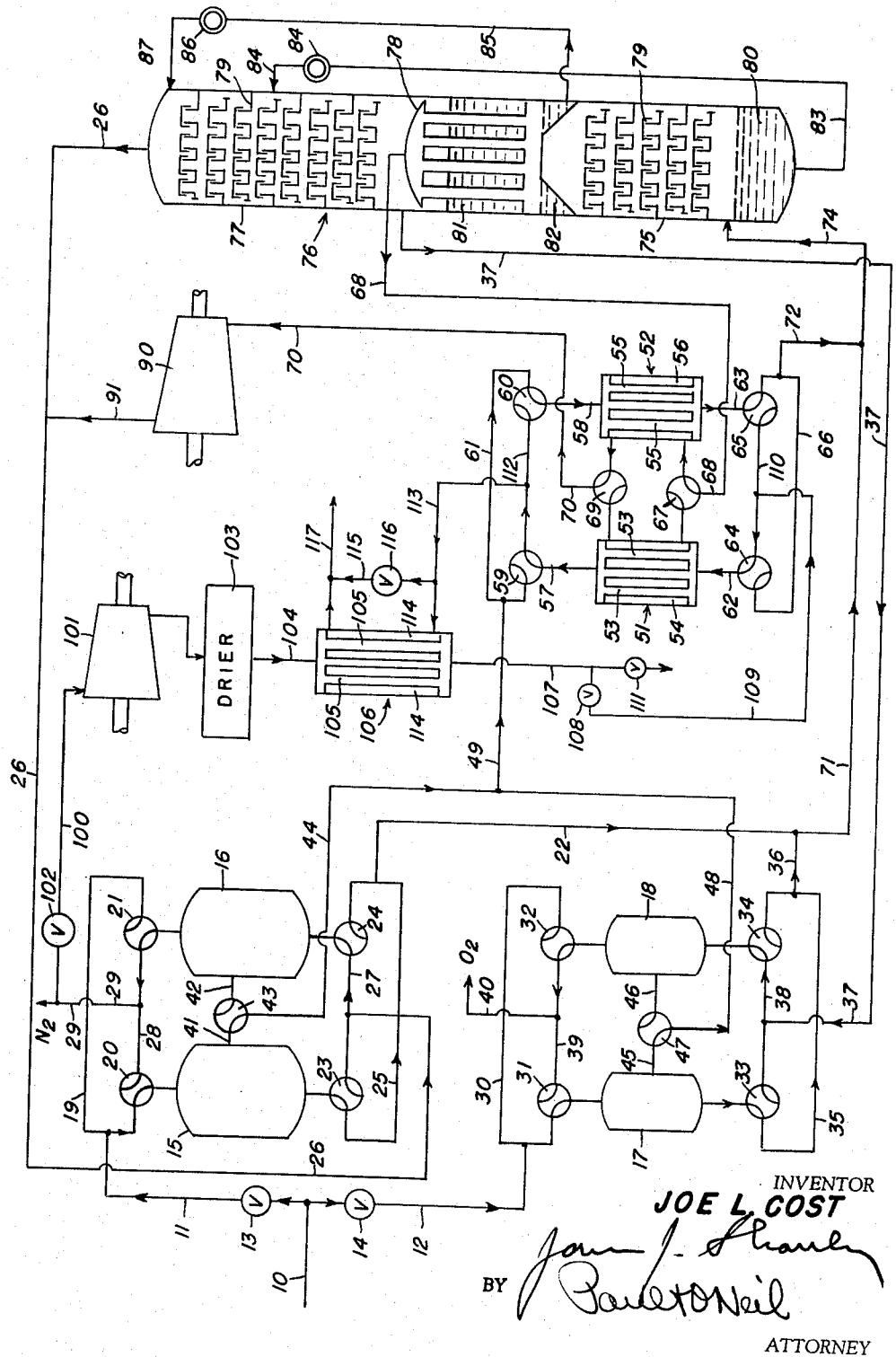
INVENTOR
JOE L. COST
BY
ATTORNEY United States Patent Office 2,955,434
Patented Oct. 11, 1960

2,955,434
METHOD AND APPARATUS FOR FRACTIONATING GASEOUS MIXTURES

Joe L. Cost, Allentown, Pa., assignor to Air Products Incorporated, a corporation of Michigan Filed Oct. 15, 1956, Ser. No. 615,925
9 Claims. (Cl. 62—13)

The present invention relates to improvements in the separation of gaseous mixtures, and more particularly to a novel method of and apparatus for removing congealable impurities from gaseous mixtures by a low temperature process.

In the separation of gaseous mixtures by liquefaction and fractionation, such as the separation of air into oxygen and nitrogen components, compressed gaseous mixture may be cooled to a temperature below the precipitation temperature of impurities included in the gaseous mixture by countercurrent heat exchange relation with fractionation products during the process of cooling the gaseous mixture prior to its liquefaction. By employing switching heat interchangers in which the countercurrently flowing gaseous mixture and cold fractionation product are alternately conducted through a common passageway of the heat interchangers, the impurities precipitated from the gaseous mixture and deposited in the common passageway are removed therefrom by the outwardly flowing product. However, due to the difference in specific heats of the high pressure gaseous mixture and the relatively low pressure fractionation product, complete removal of deposited impurity does not result in cases where the gaseous mixture and the cold product are of equal mass. Consequently, a number of unbalancing arrangements have been proposed in the art for effecting complete purging or deriming of switching heat interchangers.

One of the prior arrangements provides for the removal of a side stream of gaseous mixture from the heat interchanger at a temperature level above the precipitation temperature of the impurities, the quantity of the side stream of gaseous mixture being regulated to effect a mass unbalance between the countercurrently flowing gaseous mixture and fractionation product flowing through the common passageway of the heat interchanger and thus provide substantially complete purification of the main portion of the gaseous mixture flowing through the heat interchanger as well as complete deriming of the heat interchanger. The side stream of gaseous mixture is cooled and purified by countercurrent heat exchange with a cold fluid from the fractionating operation, such as a stream of nitrogen product withdrawn from the high pressure stage of a two stage air fractionating column.

In order to provide continuous operation a pair of heat exchange means are employed for purifying the side stream of gaseous mixture. These heat exchange means are arranged in parallel relation and are alternately connected "on stream" to continuously purify the side stream of gaseous mixture by a low temperature process in which the impurities are precipitated from the gaseous mixture and deposited in the passageways of the heat exchange means. When "off stream" the heat exchange means are purged of impurities deposited in the passageway. In accordance with the prior art, the purging operation is accomplished by passing a fluid stream at ambient temperature through the fouled passageways of the heat exchange means to effect vaporization of the deposited impurities and sweeping of the vaporized impurities from the heat exchange means. The use of a purging fluid at ambient temperature raises the temperature of the heat exchange means to above the vaporization temperature of the deposited impurities approaching ambient temperature inasmuch as the purging gas must flow through the fouled passageways for an appreciable period of time to effect complete deriming. In order to prevent disturbing effects upon the fractionating operation and the introduction of a quantity of impurity into the fractionating column, it is necessary to cool the purged heat exchange means to its normal operating temperature prior to switching the heat exchange means "on stream." Inasmuch as the heat exchange means for cooling and purifying the side stream of gaseous mixture must be switched and purged at frequent intervals this requirement adds an appreciable refrigeration load to the cycle and materially decreases its efficiency.

The present invention solves this problem by providing a novel method of and apparatus for deriming a pair of heat exchange means, adapted for cooling and purifying a side stream of gaseous mixture, without increasing the temperature of the heat exchange means to a level appreciably greater than the lowest temperature required for removing the deposited impurities. This is accomplished by an arrangement in which refrigeration present in the purging gas flowing from the fouled passageways of the heat exchange means is utilized to control the temperature level of the purging gas fed to the heat exchange means.

The foregoing will be more fully understood from the following detailed description considered in connection with the accompanying drawing which diagrammatically illustrates a gaseous mixture fractionating cycle embodying the principles of the present invention. It is to be expressly understood however that the drawing is designed for purposes of illustration only and not as a definition of the limits of the invention, reference for the latter purpose being had to the appended claims. For example, the present invention is not limited to the separation of air but has application to the separation of other gaseous mixtures, such as hydrocarbons.

With reference to the drawing, a stream of warm air under superatmospheric pressure is introduced to the cycle through a conduit 10 feeding branch conduits 11 and 12. The branch conduits 11 and 12 are provided with valves 13 and 14, respectively, for dividing the air stream into two streams approximating the proportions of the products of the cycle. Thus, for example, the valves are adjusted so that the air stream in the conduit 11 comprises 80% of the incoming air feed while the air stream in the conduit 12 comprises approximately 20% of the incoming air feed, the percentages respectively corresponding to the approximate proportions of nitrogen and oxygen components of air.

A pair of switching heat exchangers 15 and 16, of the regenerator or cold accumulator type, are provided for cooling the portion of the incoming air fed through the conduit 11 by heat interchange with a stream of cold nitrogen product, while a pair of switching regenerators or cold accumulators 17 and 18 are provided for cooling the portion of the incoming air feed introduced by way of the conduit 12 by heat interchange with a steam of oxygen product. The conduit 11 is connected to a manifold 19 having connections through switching valves 20 and 21 to the upper ends of the accumulators 15 and 16, respectively, while the lower ends of the latter accumulators are connected to a cold air stream supply conduit 22 through switching valves 23, 24 and a common manifold 25. A stream of cold nitrogen product gas, from the fractionating column described below, is conducted by way of a conduit 26 to a manifold 27 feeding the switching valves 23 and 24, and the switching valves 20 and 21 are connected to a common manifold 28 feeding a nitrogen product outlet conduit 29. Similarly, the conduit 12 communicates through a common manifold 30 to switching valves 31 and 32 connected to the upper ends of the accumulators 17 and 18, respectively, while the lower ends of the latter accumulators are connected to switching valves 33 and 34 feeding a common manifold 35 connected to a cold air stream supply conduit 36. Also, a conduit 37, supplying a stream of oxygen product from the fractionating column, feeds a manifold 38 connected to the switching valves 33 and 34, and the switching valves 31 and 32 are connected to a common conduit 39 having a connection with an oxygen product outlet conduit 40. With the switching valves 20, 21, 31 and 32 positioned as shown in the drawing, the incoming air feed flows through the accumulators 15 and 17 while cold nitrogen product flows through the accumulator 16 and cold oxygen product flows through the accumulator 18, and upon operation of the switching valves to their other position, the incoming air feed flows through the accumulators 16 and 18 while the cold nitrogen product and the cold oxygen product flow through the accumulators 15 and 17, respectively. A mechanism, not shown, may be provided for synchronously operating the switching valves in predetermined cycles in accordance with conventional practice.

In order to compensate for the differences in the specific heat between the incoming air feed and the outgoing cold products of the fractionating operation and thereby insure complete deriming of the heat exchangers, a side stream of air may be removed from each of the heat exchangers at a temperature level above the precipitation temperature of the high boiling point impurity, such as carbon dioxide, to thereby unbalance the heat exchangers by controlling the relative mass of the streams countercurrently flowing therethrough. If desired, the mass of the incoming air flowing to the nitrogen heat exchangers or to the oxygen heat exchangers may be proportioned relative to the mass of respective cold products to obtain mass unbalance in either the nitrogen or in the oxygen heat exchangers, and unbalance of the other heat exchangers may be accomplished by removing a side stream of air therefrom. In the cycle shown in the drawing, side conduits 41 and 42 lead from medial points of the accumulators 15 and 16, respectively, and communicate with a switching valve 43 having a connection with a side stream conduit 44, and side conduits 45 and 46 lead from medial points of the accumulators 17 and 18, respectively, and are connected through a switching valve 47 to a side stream conduit 48. The side stream conduits 44 and 48 feed a common conduit 49, and the medial points of the accumulators to which the conduits 41, 42, 45 and 46 are connected are located above the precipitation temperature of the impurity present. The switching valves 43 and 47 may be operated in synchronism with the switching valves 20, 21, 23, 24, 31, 32, 33 and 34 so that the side conduit connected to the accumulators passing the incoming air are in communication with respective side stream conduits 44 and 48.

A pair of recuperative heat exchange means 51 and 52, which may be of the tubular, extended surface or any other suitable type, are provided for cooling and purifying the side stream of air in the conduit 49. The heat exchange means 51 and 52 each include a pair of separate passageways 53, 54 and 55, 56, respectively. The upper ends of the passageways 53 and 55, as viewed in the drawing, are connected through conduits 57 and 58 to switching valves 59 and 60, and the switching valves are connected to a common manifold 61 fed from the side stream conduit 49. The lower ends of the passageways 53 and 55 are connected through conduits 62 and 63 to switching valves 64 and 65 and the switching valves are connected to a common manifold 66. The lower ends, as viewed in the drawing, of the passageways 54 and 56 are connected through a switching valve 67 to a conduit 68 feeding a stream of relatively cold fluid from a fractionating column described below, and the upper ends of the passageways communicate through a switching valve 69 to an outlet conduit 70. Apparatus, not shown, may be provided for synchronously operating the switching valves 59, 60, 64, 65, 67 and 69 to connect one of the heat exchange means "on stream," with the side stream of air and the cold fluid stream flowing in countercurrent heat exchange relation, while connecting the other current heat exchange means "off stream," and for alternately switching the heat exchange means 51 and 52 between "on stream" and "off stream" conditions.

The air feed conduits 22 and 36 conducting cooled purified air from the accumulators 15, 16, 17 and 18 are joined to a conduit 71 having a connection with a conduit 72 feeding the purified side stream of air from the manifold 66. The total incoming air feed is then conducted through a conduit 74 and introduced into the base of a high pressure section 75 of a two stage fractionating column 76. The fractionating column also includes a low pressure section 77 positioned above and spaced from the high pressure section by a refluxing condenser 78 in a conventional manner. Each of the sections are provided with liquid vapor contact means 79 which may be of the bubble cap type, as shown. The air feed is liquefied and undergoes preliminary fractionation in the high pressure section 75 producing liquid crude oxygen low boiling point fraction collecting in a pool 80 in the base of the section and gaseous nitrogen high boiling point fraction which flows upwardly into the refluxing condenser 78 and is liquefied therein by heat exchange with liquid oxygen product collecting in a pool 81 in the base of the low pressure section. Liquefied high pressure nitrogen fraction flows downwardly from the refluxing condenser with a portion collecting in a pool 82 and the remainder entering the high pressure section as reflux liquid. A stream of liquid crude oxygen is withdrawn from the pool 80 by way of a conduit 83, passed through an expansion valve 84 and introduced through a conduit 85 to a medial point of the low pressure section 77 as feed, and a stream of liquid high pressure nitrogen fraction is withdrawn from the pool 82 through a conduit 85, passed through an expansion valve 86 and then introduced by way of a conduit 87 into the upper end of the low pressure section as liquid reflux. In the low pressure section the fractionating operation is completed producing liquid oxygen product collecting in the pool 81 and a gaseous product which collects in the upper end of the low pressure section and is withdrawn therefrom by way of the conduit 26 which conducts relatively cold nitrogen product to the accumulators 15 and 16 in the manner described above. Oxygen product is withdrawn from the column in gaseous phase by way of the conduit 37 which has a connection with the low pressure section above the pool 81 of liquid oxygen product, the conduit 37, as described above, feeds relatively cold oxygen product to the accumulators 17 and 18. The conduit 68 is connected to the dome of the refluxing condenser 78 to withdraw a stream of gaseous high pressure nitrogen fraction from the refluxing condenser and conduct the stream through the heat exchange means 51 or 52 depending upon the position of the switching valves 67 and 69. The stream of high pressure gaseous nitrogen fraction is warmed upon flowing through the heat exchange means 51 or 52, and the warmed stream is conducted by way of the conduit 70 to an expansion engine 90, the temperature of the nitrogen fraction stream being such that liquefaction does not occur during the expansion process. The effluent from the expansion engine 90 is introduced through a conduit 91 into the stream of low pressure nitrogen product flowing through the conduit 26 to the accumulators 15 or 16. Refrigeration obtained upon expansion of the warmed high pressure nitrogen fraction stream provides make-up refrigeration for the cycle.

With the switching valves 59, 60, 64, 65, 67 and 69 positioned as shown in the drawing, the heat exchange means 52 is on-stream with the side stream of air flowing through the passageways 55 in heat exchange relation with the stream of high pressure gaseous nitrogen fraction flowing in countercurrent relation through the passageways 56, while the heat exchange means 51 is off-stream and is isolated from the side stream of air feed and from the high pressure gaseous nitrogen fraction stream. The side stream of air flowing through the heat exchange means 52 is cooled to a temperature below the precipitation temperature of the high boiling point impurities therein such as carbon dioxide, and the precipitated high boiling point impurities are deposited in the passageways 55. At a time before precipitated impurities deposited in the passageways 55 build up to such an extent as to affect efficiency of the cycle, the valves 59, 60, 64, 65, 67 and 69 are moved to their other positions to switch the heat exchange means 51 on-stream and the heat exchange means 52 off-stream. During the period when the heat exchange means 51 and 52 are off-stream they are subjected to a purging operation to remove precipitated high boiling point impurities deposited in the passageways 53 and 55, respectively.

As mentioned above, the present invention provides a novel method of and apparatus for purging heat exchange means, such as the heat exchange means 51 and 52 which function to cool and purify the side stream of air feed, in such a manner so that only the absolute minimum quantity of heat required for removal of deposited precipitated impurity is introduced into the cycle and so that moisture is prevented from entering the cycle during the purging operation. As shown in the drawing, a stream of purging gas, such as a stream of nitrogen product gas withdrawn from the nitrogen outlet conduit 29, is passed by a conduit 100 to the input of a compressor 101, a valve 102 being provided in the conduit 100 to determine the mass of the stream of purging gas. The stream of purging gas from the compressor 100 is passed through a drier 103 of conventional construction to remove substantially the total moisture therefrom. From the drier 103 the stream of purging gas is conducted by way of a conduit 104 to passageways 105 of a recuperative heat exchange device 106 which may be of the tubular, extended surface or any other suitable type. The stream of purging gas is passed from the heat exchange device 106 by way of a conduit 107, normally open valve 108 and conduit 109 to a manifold 110 connected to the switching valves 64 and 65. For a purpose that will appear more fully below, the conduit 107 terminates in a drain provided with a control valve 111. The switching valves 59 and 60 are connected to a manifold 112 which feeds a conduit 113 communicating with the passageways 114 at one end of the heat exchange device 106 and with a bypass conduit 115 provided with a control valve 116. An outlet conduit 117 for the purging gas is connected to the bypass conduit 115 downstream of the control valve 116 and to the passageways 114 at the other end of the heat exchange device 106.

With the valves 59, 60, 64, 65, 67 and 69 positioned as shown to switch the heat exchange means 51 off-stream, the stream of purging gas flows through the passageways 53 of the heat exchange means 51, it being assumed that the passageways 53 have deposits therein of high boiling point impurity precipitated from the air stream which flowed therethrough during the previous cycle in which the heat exchange means 51 was on-stream. The purging gas enters the lower ends of the passageways 53 substantially at a temperature no higher than that required to effect vaporization of the deposited impurities upon flowing of the stream of purging gas through the passageways 53, and the stream of purging gas flowing through the passageways 53 sweeps the vaporized impurities from the heat exchange means 51. The stream of purging gas leaving the heat exchange means 51 through the conduit 57 is thus at a lower temperature than the temperature of the purging gas entering the heat exchange means 51, and the relatively cold stream of purging gas flowing through the passageways 114 of the heat exchange device 106 cools the incoming stream of purging gas on its way to the heat exchange means 51. The mass of relatively cold purging gas passed through the passageways 114 is controlled by the valve 116 in the bypass conduit 115 to maintain the temperature of the purging gas entering the heat exchange means 51 substantially no greater than that required to effect removal of the deposited precipitated impurities. Thus, the heat exchange means 51 is only warmed during the purging process to a temperature level required to effect removal of the deposited precipitated impurities. When the valves 59, 60, 64, 65, 67 and 69 are moved to their other positions to switch the heat exchange means 51 on-stream and the heat exchange means 52 off-stream, the purging gas is conducted through the passageways 55 of the latter heat exchange means. The heat exchange means 51 and 52 are periodically switched between on-stream and off-stream conditions at a rate such that deposits of precipitated impurities in the passageways 53 and 55 do not adversely affect efficiency of the cycle. Thus the stream of purging gas on its way to the heat exchange means 51 or 52 and the stream of purging gas from the heat exchange means 51 or 52 substantially continuously flow through the passageways 105 and 114, respectively, of the heat exchange device 106, and the temperature of the stream of purging gas fed to the manifold 110 may be maintained at a substantially constant temperature under control of the valve 116 in the bypass connection 115. As mentioned above, the valve 116 is adjusted to maintain the incoming purging gas at the minimum temperature required for purging the heat exchange means. This arrangement prevents periodic application of heat into the cycle and provides for more uniform and efficient operation.

The novel arrangement for purging the heat exchange means 51 and 52 also functions to prevent introduction of moisture into the cycle through the purging fluid. The maximum temperature of the purging gas fed to the heat exchange means 51 and 52 while off-stream is below the freezing temperature of water, and any moisture that may be present in the purging gas leaving the drier 103 is condensed as the purging gas flows through the heat exchange device 106 and is solidified on the surfaces of the passageways 105. After an extended period of operation ice and frost will accumulate on the surfaces of the passageways 105 of the heat exchange device 106 and it will become necessary to defrost the heat exchange device 106. The rate of accumulation will depend upon the quantity of moisture in the purging gas leaving the drier 103 and ordinarily it will be necessary to defrost the heat exchange device 106 only after numerous switching cycles of the heat exchange means 51 and 52. The heat exchange device may be defrosted by opening the drain valve 111 and closing the valve 108 to thereby pass the stream of purging gas through the heat exchange device 106 and out of the drain connected to the conduit 107. This action will warm the heat exchange device to ambient temperature and the resulting liquefied frost and ice deposits will drain from the heat exchange device and will be blown past the open drain valve 111. After the defrosting operation the valve 108 is opened and the valve 111 closed to conduct the stream of purging gas passed through the air passageways of the heat exchange means 51 or 52. The residual cold of the heat exchange means is employed to cool down the heat exchange device 106 and for this purpose it may be preferably to close the by-pass valve 116 and pass the total stream of cold purging gas through the passageways 114.

The time required for purging the heat exchange means 51 and 52 is less than their switching periods, and the duration of the off-stream cycle of the heat exchange means 51 and 52 is such as to provide a sufficient period of time to permit purging of the heat exchange means 51 and 52 as well as defrosting of the heat exchange device 106 should the latter operation be necessary. In particular, when the heat exchange means 51 is off-stream, and after the heat exchange means 51 is purged, sufficient time will remain before the heat exchange means 51 is switched on-stream to permit defrosting of the heat exchange device 106. The heat exchange device 106 may be defrosted while either the heat exchange means 51 or 52 is off-stream, and the defrosting operation may take place at the beginning of the off-stream cycle of the heat exchange means before the purging operation, or after the purging operation but before the heat exchange means is switched on-stream.

In operation of the cycle described above, a stream of air under superatmospheric pressure is introduced by way of the conduit 10 and divided by means of valves 15 and 14 in accordance with the proportions of the oxygen and nitrogen components of the air with the major portion of the incoming air feed passing through the accumulators 15 and 16 in heat interchange relation with the nitrogen product and with the minor portion of the incoming air passing through the accumulators 17 and 18 in heat interchange relation with the oxygen product. A side stream of air is withdrawn from the heat exchangers 15 or 16 and from the heat exchangers 17 or 18, depending upon which accumulators are passing the incoming air, in order to unbalance the accumulators and effect substantially complete deriming of high boiling point impurities deposited therein. The air side streams are merged in the conduit 49 and alternately passed through passageways of heat exchange means 51 and 52 in heat exchange relation with a stream of relatively cold high pressure gaseous nitrogen fraction withdrawn from the refluxing condenser 78 by way of conduit 68. In the heat exchange means 51 and 52 the side stream of air is purified and cooled to approximately the temperature of the major and minor portions of the air stream leaving the accumulators 15, 16, 17 and 18, and the total air feed is introduced into the fractionating column. The high pressure gaseous nitrogen fraction is warmed upon passing through the heat exchange means 51 or 52 and is expanded with work in the expansion engine 90 to provide refrigeration for the cycle. The heat exchange means 51 and 52 are alternately switched between on-stream and off-stream conditions, and while on off-stream a stream of purging gas is fed through the air passageways in countercurrent relation with respect to the direction of the air flow to vaporize the deposited precipitated high boiling point impurities and sweep the impurities therefrom. The temperature of the purging gas is controlled by means of the heat exchange device 106 and the bypass control valve 116 upon utilizing refrigeration obtained from the deposited precipitated impurities to maintain the heat exchange means 51 or 52 at a minimum temperature level required for purging while at the same time insuring complete removal of moisture from the purging gas and thus preventing moisture deposits in the air passageways of the heat exchange means 51 and 52 during their purging.

There is thus provided by the present invention a novel method of and apparatus for removing congealable impurities from gaseous mixtures by a low temperature process in a continuous operation in which a side stream of gaseous mixture is removed from the main heat exchangers to unbalance the mass of the fluid streams flowing therethrough and in which the side stream of gaseous mixture is purified in a pair of switching recuperative heat exchangers which are alternately purged by a stream of purging gas maintained at a substantially constant temperature no higher than that required for the purging process. The temperature of the purging gas is controlled by utilizing refrigeration obtained from impurities deposited in the regenerative heat exchangers and removed therefrom during the purging process. The purging process provided by the present invention also insures complete removal of moisture from the purging gas and thereby prevents introduction of moisture in the cycle.

Although only one embodiment of the invention has been disclosed and described above, it is to be expressly understood that various changes and substitutions may be made therein without departing from the spirit of the invention as well understood by those skilled in the art. Reference therefor will be had to the appended claims for a definition of the limits of the invention.

What is claimed is:

1. Method of purging a heat exchanger including a passageway through which gaseous mixture including high boiling point impurity is passed in heat exchange relation with a relatively cold fluid to cool the gaseous mixture to a temperature at least below the precipitation temperature of the high boiling point impurity so that the high boiling point impurity is precipitated and deposited in the passageway, which method comprises terminating flow of gaseous mixture through the passageway after high boiling point impurity is precipitated and deposited therein and passing a stream of purging gas through the passageway to vaporize the deposited precipitated impurity and sweep the impurity from the passageway, the purging gas leaving the passageway being cold relative to the purging gas entering the passageway, passing a stream of relatively cold purging gas from the passageway in heat exchange relation with the stream of purging gas on its way to the passageway, and controlling the mass of the stream of relatively cold purging gas passed in heat exchange relation with the stream of purging gas on its way to the passageway to maintain the temperature of the stream of purging gas entering the passageway at a temperature level sufficient to effect vaporization of the precipitated impurity.

2. The method defined in claim 1 in which the temperature level of the purging gas entering the passageway is below the freezing temperature of water vapor at the existing pressure and in which water vapor is separated from the purging gas prior to its entry into the passageway.

3. Method of purging a heat exchanger including a passageway through which gaseous mixture including high boiling point impurity is passed in heat exchange relation with a relatively cold fluid to cool the gaseous mixture to a temperature at least below the precipitation temperature of the high boiling point impurity so that the high boiling point impurity is precipitated and deposited in the passageway, which method comprises terminating the flow of gaseous mixture through the passageway after high boiling point impurity is precipitated and deposited therein and passing a stream of purging gas through the passageway in countercurrent relation with respect to the passageway in countercurrent heat exchange therethrough to vaporize the deposited precipitated impurity and sweep the impurity from the passageway, the purging gas leaving the passageway being cold relative to the purging gas entering the passageway, passing a stream of relatively cold purging gas from the passageway in countercurrent heat exchange relation with the stream of purging gas on its way to the passageway, and controlling the mass of the stream of relatively cold purging gas passed in heat exchange relation with the stream of purging gas on its way to the passageway to maintain the temperature of the stream of purging gas entering the passageway at a critical temperature substantially no higher than that required to effect vaporization of the precipitated impurity.

4. In the separation of gaseous mixtures including high boiling point impurity by a fractionating operation, in which operation a stream of gaseous mixture and a stream of sweeping gas are alternately passed in opposite directions through a common heat exchange zone, the stream of gaseous mixture being in heat exchange relation with a stream of cold product of the fractionating operation to cool the gaseous mixture to at least the precipitation temperature of the high boiling point impurity so that the high boiling impurity is precipitated and deposited in the zone, and in which a side stream of gaseous mixture is withdrawn from the zone at a level above the precipitation temperature of the high boiling impurity to unbalance the mass of the gaseous mixture and the sweeping gas and effect complete deriming of the heat exchange zone by the stream of sweeping gas, the method of cooling and purifying the side stream of gaseous mixture comprising the steps of alternately passing the side stream of gaseous mixture through passageways of a pair of heat exchangers in heat exchange relation with a stream of relatively cold fluid from the fractionating operation to cool the side stream of gaseous mixture to at least the precipitation temperature of the high boiling impurity so that the high boiling impurity is precipitated and deposited in the passageways, alternately passing a stream of warm purging gas through the passageways following flow of the side stream through the passageways and in countercurrent relation with respect to the flow of the side stream, passing a stream of purging gas from the passageways in heat exchange relation with the stream of warm purging gas flowing to the passageways, controlling the mass of the stream of purging gas from the passageways and passed in heat exchange relation with the warm purging gas to maintain the passageways at a temperature substantially equal to the temperature required to effect vaporization of the deposited impurity, merging the side stream of gaseous mixture flowing from the passageways with the cold gaseous mixture flowing from the heat exchange zone, and fractionating the merged stream.

5. The method defined in claim 4 in which the warm purging gas is maintained at a temperature below the freezing temperature of water at the existing pressure and in which water is removed from the warm purging gas before its entry into the passageways.

6. In the separation of gaseous mixtures including high boiling point impurity by a fractionating operation, in which operation a stream of gaseous mixture and a stream of sweeping gas are alternately passed in opposite directions through a common heat exchange zone, the stream of gaseous mixture being in heat exchange relation with a stream of cold product of the fractionating operation to cool the gaseous mixture to at least the precipitation temperature of the high boiling point impurity so that the high boiling point impurity is precipitated and deposited in the common zone, and in which a side stream of gaseous mixture is withdrawn from the zone at a level above the precipitation temperature of the high boiling point impurity to unbalance the mass of the gaseous mixture and the sweeping gas and effect complete deriming of the heat exchange means, a pair of recuperative heat exchangers, means for alternately passing the side stream of gaseous mixture through passageways of the recuperative heat exchangers in heat exchange relation with cold fluid from the fractionating operation to cool the side stream of gaseous mixture to a temperature at least as low as the precipitation temperature of the high boiling point impurity so that the high boiling point impurity is precipitated and deposited in the passageways of the recuperative heat exchangers, a source of warm purging gas, a recuperative heat exchange device, means for passing a stream of warm purging gas from the source through a pass of the recuperative heat exchange device and alternately through the passageways of the heat exchangers to vaporize deposited impurity and sweep the impurity from the passageways, means for passing a stream of purging gas from the passageways through another pass of the recuperative heat exchange device in heat exchange relation with the stream of warm purging gas, means for controlling the mass of the stream of purging gas flowing through the another pass of the recuperative heat exchange device to maintain the warm stream of purging gas at a temperature substantially no greater than that required to effect vaporization of the deposited impurity, and means for fractionating the gaseous mixture.

7. In the separation of gaseous mixtures as defined in claim 6 in which the temperature level of the warm purging gas is below the freezing temperature of water at the existing pressure and means are provided for removing condensate from the stream of warm purging gas prior to its entry into the passageways.

8. Method of purging a heat exchanger including a passageway through which gaseous mixture including high boiling point impurity is passed in one direction in heat exchange relation with a relatively cold fluid to cool the gaseous mixture to a temperature at least below the precipitation temperature of the high boiling point impurity so that the high boiling point impurity is precipitated and deposited in the passageway, which method comprises passing a relatively warm stream of purging gas through one pass of a heat exchange device, terminating the flow of gaseous mixture through the passageway after high boiling point impurity is precipitated and deposited therein and passing a stream of relatively warm purging gas from the heat exchange device through the passageway in the other direction to vaporize the deposited precipitated impurity and sweep the impurity from the passageway, passing a stream of purging gas from the passageway through another pass of the heat exchange device, controlling the mass of the stream of purging gas passed through the another pass of the heat exchange device to maintain the temperature of the warm purging gas entering the passageway at a critical temperature to raise the temperature of the heat exchanger only to a level required to effect purging of the deposited impurity, removing water vapor from the stream of purging gas prior to its entry into the passageway, and maintaining the temperature of the warm purging gas leaving the heat exchange device below the freezing temperature of water vapor at the existing pressure.

9. Method of continuously cooling and purifying gaseous mixture including high boiling point impurity which comprises, alternately passing a stream of gaseous mixture through passageways of a pair of heat exchangers in countercurrent heat exchange relation with relatively cold fluid to cool the gaseous mixture to a temperature at least below the precipitation temperature of the high boiling point impurity so that the high boiling point impurity is precipitated and deposited in the passageways of the heat exchangers, alternately passing a stream of warm purging gas through the passageways of the heat exchangers following the flow of gaseous mixture through the passageways and in countercurrent relation with the flow of the gaseous mixture to vaporize high boiling point impurity deposited in the passageways and sweep the impurity from the passageways, passing a stream of purging gas flowing from the passageways in heat exchange relation with the stream of warm purging gas on its way to the passageways, controlling the mass of the stream of purging gas from the passageways and passed in heat exchange relation with the stream of warm purging gas to maintain the warm purging gas at a critical temperature substantially no higher than that required to effect vaporization of the deposited impurity at the existing pressure, removing water from the warm purging gas prior to its entry into the passageways, and maintaining the temperature of the warm purging gas below the freezing temperature of water at the existing pressure.

(References on following page)

References Cited in the file of this patent

UNITED STATES PATENTS

| | | |
|---|---|---|
| 2,496,380 | Crawford | Feb. 7, 1950 |
| 2,503,939 | De Baufre | Apr. 11, 1950 |
| 2,534,478 | Roberts | Dec. 19, 1950 |
| 2,572,933 | Houvener | Oct. 30, 1951 |
| 2,586,811 | Garbo | Feb. 26, 1952 |
| 2,619,810 | Rice | Dec. 2, 1952 |
| 2,622,416 | Ogorzaly | Dec. 23, 1952 |
| 2,655,796 | Rice | Oct. 20, 1953 |
| 2,698,523 | Hnlicka | Jan. 4, 1955 |
| 2,835,115 | Karwat | May 20, 1958 |

UNITED STATES PATENT OFFICE

CERTIFICATION OF CORRECTION

Patent No. 2,955,434                  October 11, 1960

Joe L. Cost

It is hereby certified that error appears in the above numbered patent requiring correction and that the said Letters Patent should read as corrected below.

Column 2, line 69, for "steam" read -- stream --.

Signed and sealed this 25th day of April 1961.

(SEAL)
Attest:

ERNEST W. SWIDER                         DAVID L. LADD
Attesting Officer                           Commissioner of Patents